United States Patent [19]
Leung

[11] Patent Number: 5,822,580
[45] Date of Patent: Oct. 13, 1998

[54] OBJECT ORIENTED PROGRAMMING BASED GLOBAL REGISTRY SYSTEM, METHOD, AND ARTICLE OF MANUFACTURE

[75] Inventor: Wyatt Leung, Santa Clara, Calif.

[73] Assignee: Object Technology Licensing Corp., Cupertino, Calif.

[21] Appl. No.: 590,344

[22] Filed: Jan. 19, 1996

[51] Int. Cl.$^6$ .................................................. G06F 17/30
[52] U.S. Cl. ......................... 395/614; 395/610; 395/683
[58] Field of Search .................................. 395/610, 614, 395/683

[56] References Cited

U.S. PATENT DOCUMENTS

| | | | |
|---|---|---|---|
| 4,821,220 | 4/1989 | Duisberg | 364/578 |
| 4,860,204 | 8/1989 | Gendron | 395/702 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,847 | 12/1991 | Fromme | 395/700 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas et al. | 395/650 |
| 5,133,075 | 7/1992 | Risch | 395/800 |
| 5,151,987 | 9/1992 | Abraham et al. | 395/575 |
| 5,159,687 | 10/1992 | Richburg | 395/702 |
| 5,181,162 | 1/1993 | Smith et al. | 364/419 |
| 5,297,284 | 3/1994 | Jones et al. | 395/700 |
| 5,315,703 | 5/1994 | Matheny et al. | 395/164 |
| 5,317,741 | 5/1994 | Schwanke | 395/700 |
| 5,325,533 | 6/1994 | McInerney et al. | 395/700 |
| 5,327,562 | 7/1994 | Adcock | 395/700 |

(List continued on next page.)

OTHER PUBLICATIONS

Dumas, Joseph and Paige Parsons. "Discovering the Way Programmers Think: New Programming Environments." *Communications of the ACM*. Jun. 1995: pp. 45–56.

Pascoe, Geoffrey A. "Encapsulators: A New Software Paradigm in Smalltalk–80." *OOPSLA '86 Proceedings*. Sep. 1986: pp. 341–346.

Purtilo, James M. and Joanne M. Atlee. "Module Reuse by Interface Adaptation." *Software —Practice and Experience*. Jun. 1991: pp. 539–556.

Lam, Siman S. "Protocol Conversion." *IEEE Transactions on Software Engineering*. Mar. 1988: pp. 353–362.

Thatte, Satish R. "Automated Synthesis of Interface Adapters for Reusable Classes." *POPL, '94*. Jan. 1994: pp. 174–187.

Yellin, Daniel M. and Robert E. Strom. "Interfaces, Protocols, and the Semi–Automatic Construction of Software Adaptors." *OOPSLA '94*. Oct. 1994: pp.176–190.

Jacobson, Ivar and Fredrik Lindstrom. "Re–engineering of old systems to an object–oriented architecture." *OOPSLA '91*. pp. 340–350.

(List continued on next page.)

*Primary Examiner*—Thomas G. Black
*Assistant Examiner*—Diane Mizrahi
*Attorney, Agent, or Firm*—Kudirka & Jobse

[57] ABSTRACT

A data-driven global registry method for use to extend a framework in an object oriented programming (OOP) based computer system is provided. The method includes providing a new class defined in a shared class library which has data members and member functions related to a particular task. In addition, a new class attributes file which specifies attributes associated with the new class is generated. The new class attributes file is placed in a global registry configuration directory in a computer system such that a plurality of client applications can access the global registry configuration directory to determine if the new class has been installed in the class library. In an alternative embodiment, an object-based global registry method is provided. In addition, a storage device readable by a computer system for implementing either OOP-based global registry method and OOP-based global registries themselves are provided.

27 Claims, 5 Drawing Sheets

U.S. PATENT DOCUMENTS

| | | | |
|---|---|---|---|
| 5,339,430 | 8/1994 | Lundin et al. | 395/700 |
| 5,339,438 | 8/1994 | Conner et al. | 395/700 |
| 5,421,016 | 5/1995 | Conner et al. | 395/700 |
| 5,423,023 | 6/1995 | Batch et al. | 395/500 |
| 5,428,792 | 6/1995 | Conner et al. | 395/700 |
| 5,432,925 | 7/1995 | Abraham et al. | 395/500 |
| 5,437,027 | 7/1995 | Bannon et al. | 395/614 |
| 5,473,777 | 12/1995 | Moeller | 395/682 |
| 5,566,302 | 10/1996 | Khalidi | 395/680 |
| 5,659,751 | 8/1997 | Heninger | 395/685 |

OTHER PUBLICATIONS

Filman, Robert E. "Retrofitting Objects." *OOPSLA '87*. Oct. 1987: pp. 342–353.

Dietrich, Walter C., Lee R. Nackman and Franklin Gracer. "Saving a Legacy with Objects." *OOPSLA '89*. Oct. 1989: 77–83.

Dotts, Alan and Don Birkley. "Development of Reusable Test Equipment Software Using Smalltalk and C." *OOPSLA '92*. Oct. 1992: pp. 31–35.

Duntemann, Jeff and Chris Marinacci. "New Objects for Old Structures." *BYTE*. Apr. 1990: pp. 261–266.

Alabiso, Bruno. "Transformation of Data Flow Analysis Models to Object–Oriented Design." *OOPSLA '88*. Sep. 1988: pp. 335–353.

Madhavji, Nazim H., Jules Desharnais, Luc Pinsonneault, and Kamel Toubache. "Adapting Modules to an Integrated Programming Environment." *IEEE International Conference on Programming Languages*. 1988: pp. 364–371.

Dutt, Nikil D. "Legend: A Language for Generic Component Library Description." *IEEE International Conference on Computer Languages*. 1990: 198–207.

| Domain | Category | Version | Format | Codec | ... | API Class | API Package | Imp Class | Imp Package |
|---|---|---|---|---|---|---|---|---|---|
| TimeMedia | Player | 1.3 | QuickTime | Indeo | ... | TPlayer | CP | TAVIMovie | OS/2 |

302

300

| Domain | Category | Version | Size | ... | API Class | API Package | Imp Class | Imp Package |
|---|---|---|---|---|---|---|---|---|
| Toolbox | View | 1.0 | 160X120 | ... | TView | CP | TAudioView | BROD |

OBJECT ORIENTED PROGRAMMING BASED GLOBAL REGISTRY SYSTEM, METHOD, AND ARTICLE OF MANUFACTURE

FIELD OF THE INVENTION

The present invention relates generally to object oriented programming based environments. More particularly, the present invention relates to a class installation scheme operable during run time for an object oriented programming based environment.

BACKGROUND OF THE INVENTION

Object oriented programming (OOP) has become increasingly used to develop complex applications. As OOP moves toward the mainstream of software design and development, various software solutions will need to be adapted to make use of the benefits of OOP. A need exists for these principles of OOP to be applied to a messaging interface of an electronic messaging system such that a set of OOP classes and objects for messaging interface can be provided. OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines will have different characteristics, but may have the same underlying functions associates with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-define data types such as time, angles, and complex numbers, or point on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

- Objects and their corresponding classes break down complex programming problems into many smaller, simpler problems.
- Encapsulation enforces data abstraction through the organization of data into small, independent objects that can communicate with each other. Encapsulation protects the data in an object from accidental damage, but allows other objects to interact with that data by calling the object's member functions and structures.
- Subclassing and inheritance make it possible to extend and modify objects through deriving new kinds of objects from the standard classes available in the system. Thus, new capabilities are created without having to start from scratch.
- Polymorphism and multiple inheritance make it possible for different programmers to mix and match characteristics of many different classes and create specialized objects that can still work with related objects in predictable ways.
- Class hierarchies and containment hierarchies provide a flexible mechanism for modeling real-world objects and the relationships among them.

Libraries of reusable classes are useful in many situations, but they also have some limitations. For example:

- Complexity. In a complex system, the class hierarchies for related classes can become extremely confusing, with many dozens or even hundreds of classes.
- Flow of control. A program written with the aid of class libraries is still responsible for the flow of control (i.e., it must control the interactions among all the objects created from a particular library). The programmer has to decide which functions to call at what times for which kinds of objects.
- Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries provide lots of flexibility. As programs grow more complex, more programmers are forced to reinvent basic solutions to basic problems over and over again.

A relatively new extension of the class library idea is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer writes instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries programmers reuse only implementations, whereas with frameworks they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved.

A more detailed description of OOP is given by Cotter, et al, *Inside Taligent Technology*, Addison-Wesley Publishing (1995).

OOP-based system environments need easy ways for users and third party developers to configure the system by dynamically installing new classes as they are developed. In other words, developers need to make current systems or frameworks aware of the existence of a new class, and end users need to make use of that new class in the system. One such way to meet these needs is to provide a registry service. Each subsystem could provide its own version of the registry, but this approach would result in duplicate work. As even more efficient solution would be to have a global registry that is general and flexible enough to accommodate the configuration needs of all subsystems of an OOP-based operating environment.

Such a global registry also should provide a useful, reliable, general, and flexible way of installing new classes into all frameworks in the system. In addition, it should be easy for existing local registries of clients to transition to this new global registry service. Also, it should isolate potential client bugs from other client applications using the global registry (e.g., not rely on the streaming of client objects). Further, it will be portable across targeted operating system platforms, and support internationalization.

The present invention provides a solution to these and other problems, and offers other advantages over the prior art.

SUMMARY OF THE INVENTION

The present invention relates to a global registry for use to extend a framework in an OOP-based computer system by making new and/or revised classes available to client applications.

In accordance with one aspect of the invention, a data-driven global registry method is provided. The method includes providing a new class defined in a shared class library on the server which has data members and member functions related to a particular task. In addition, a new class attributes file which specifies attributes associated with the new class is generated. The new class attributes file is placed in a global registry configuration directory such that a plurality of client applications can access the global registry configuration directory to determine if the new class has been installed in the class library.

In accordance with another aspect of the invention, an object-based global registry method is provided. The method includes providing a new class defined in a shared class library which has data members and member functions related to a particular task. In addition, an object factory class for the new class is defined in the shared class library which has data members and member functions related to creating instances of the new class and related to attributes associated with the new class. One or more client applications can determine if the new class has been installed in the class library by querying the provided object factory class.

Each of these aspects of the invention also can be implemented as a computer-readable program storage device which tangibly embodies a program of instructions executable by a computer system to perform either of the object oriented programming (OOP) based global registry methods. In addition, each of these aspects of the invention also can be implemented as a global registry itself for an OOP-based computer system.

These and various other features as well as advantages which characterize the present invention will be apparent upon reading of the following detailed description and review of the associated drawings.

BRIEF DESCRIPTION OF THE DRAWINGS

FIG. 3 is a block diagram of a logical table which forms a data-driven global registry.

DETAILED DESCRIPTION

Figure 1:
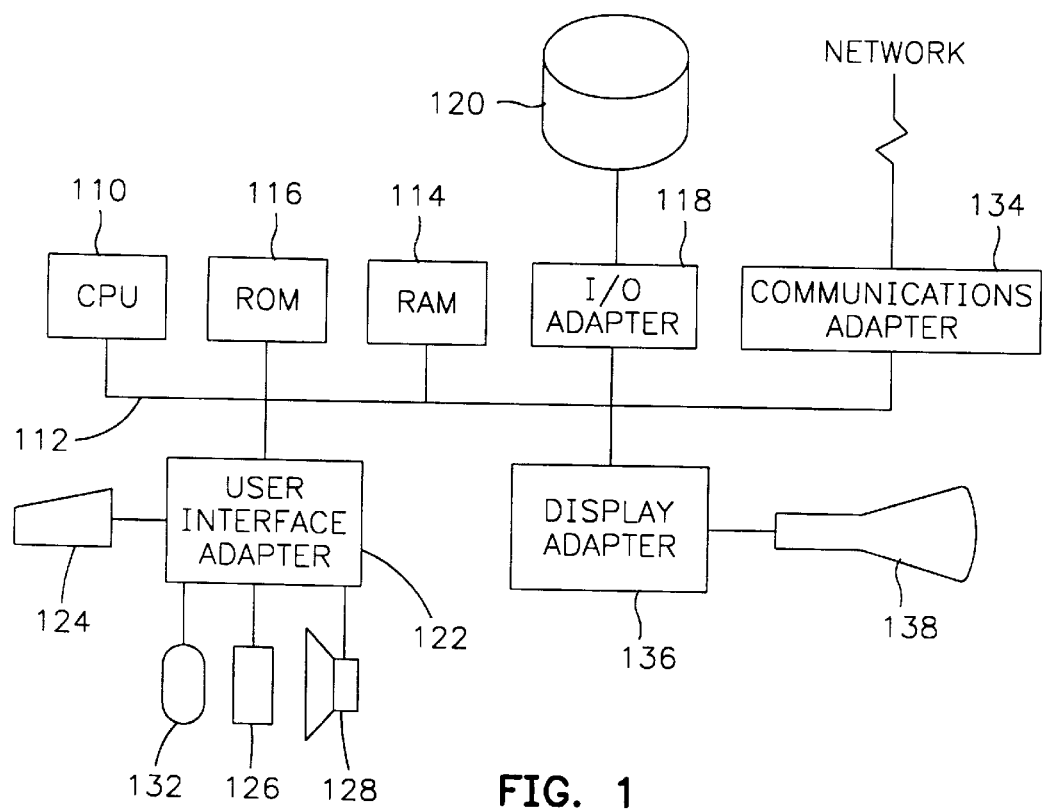
FIG. 1 is a block diagram of a personal computer system in accordance with a preferred embodiment of the present invention.

The preferred embodiments of the present invention are preferably practiced in the context of an operating system resident on a personal computer such as the IBM PS/2 or Apple Macintosh computer. A representative hardware environment is depicted in FIG. 1, which illustrates a typical hardware configuration of a workstation in accordance with the preferred embodiments having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the IBM OS/2 operating system or the Apple System/7 operating system. Those skilled in the art will appreciate that the present invention may also be implemented on platforms and operating systems other than those mentioned.

Many OOP-based operating environments for computer systems currently do not provide a way for third-party developers to configure the system by dynamically installing new classes that have been developed. That is, prior to the present invention a developer has no way to make frameworks aware of the existence of a new class, and an end user could not make use of that new class in the system.

One such OOP-based operating environment that may benefit from having a global class registry service is the CommonPoint environment developed by Taligent. Several subsystems have an immediate need for this type of registry service. Instead of each subsystem providing its own version of the registry (which would result in duplicate work), it would be more efficient to have a global class registry that is general and flexible enough to accommodate the configuration needs of all subsystems of the CommonPoint environment. The following discussion will focus on an example implementation for the time/media area and its associated specific needs for installing time/media components.

It will be appreciated by those skilled in the art that any subsystem that wants to have this "registry" service could be a client of the global class registry without departing from the scope and spirit of the present invention. For example other potential class registry service clients could be the Microsoft Windows NT operating system, workspace applications, telephony services, data translators, network directory services, file systems, servers, and software package installations.

The present global class registry preferably achieves the following goals:

Address the needs of the primary clients (e.g., time/media or operating systems).

Provide a useful, reliable, general, and flexible way of installing new subclasses into all frameworks.

Be portable across targeted operating system platforms.

Support internationalization.

Be easy for existing individual or service specific clients to transition to this new global class registry service.

The present global class registry service can be implemented in many different ways. One such way is a preferred embodiment object-based approach. For an object-based (code-based) approach, the services provided by a "framework egistry" can be divided into the following functions:

Given a set of attributes, the registry returns back a list of creators matching the attributes.

Given a set of preferences, the client selects the appropriate creator from the returned list.

An instance of the class is then created by invoking a method (e.g., CreateObject) on the creator.

The object is then initialized with the appropriate parameters specified by the client.

This approach is centered on an "object creator" mechanism (also known as an object factory) that knows how to create an instance of the class the client application is interested in generating from those stored on the server. The preferred architecture of the present object-based global registry has the global registry itself provide the first function, while the client application performs the last three steps.

For example, implementation may include a time/media registry creating a media sequence from a file system entity. Such a time/media registry can be implemented to perform the following sequence of steps when a client uses the registry to create a media sequence. For each media type, the registry iterates through its collection of sequence creators and invokes the particular sequence creator (e.g., a preferred embodiment CreateSequence class or CreateObject class) method on each creator. The file system entity and other parameters are passed to the CreateSequence class, which will be used to initialize the default media sequence after it has been created. If the returned value from CreateSequence is NIL, the next sequence creator will be tried; the first valid media sequence (non-NIL value) returned will terminate the loop.

If a global registry is used, then the create the media sequence can be implemented such that the media registry interacts with the global registry in the following way:

A set of attributes (e.g., the media type) is provided to the global registry, and the global registry is asked to return a list of sequence creators for that media type.

The media registry will use a set of user-defined preferences (set by the client before the request to get a sequence of creators) in order to select an appropriate sequence creator. At this point, the time/media registry will invoke the CreateSequence method on the returned media sequence creator with the appropriate parameters to initialize the media sequence, which will then be returned to the client application.

A preferred embodiment abstract base class is the TObjectCreator class, which has a CreateObject( ) method. Its concrete subclasses provide a set of methods for querying attributes of the "object" to be created. An example shell for this abstract class and a concrete subclass are shown below in Table 1.

TABLE 1

```
class TObjectCreator : public MCollectible {
public:
    MCollectibleDeclarationsMacro(TObjectCreator);
    ~TObjectCreator ();
    // copy and streaming operators are not shown here
    void*CreateObject() = 0;
```

TABLE 1-continued

```
protected:
    TObjectCreator ();
};

class TMediaSequenceCreator: public TObjectCreator {
public:
    MCollectibleDeclarationsMacro(TMediaSequenceCreator);
    TMediaSequenceCreator();
    ~TMediaSequenceCreator();
    // copy and streaming operators are not shown here void* CreateObject(); // it delegates to CreateSequence()

// attribute querying methods
    TMediaType GetMediaType();
protected:
    TMediaSequence* CreateSequence();
};
```

Figure 2:
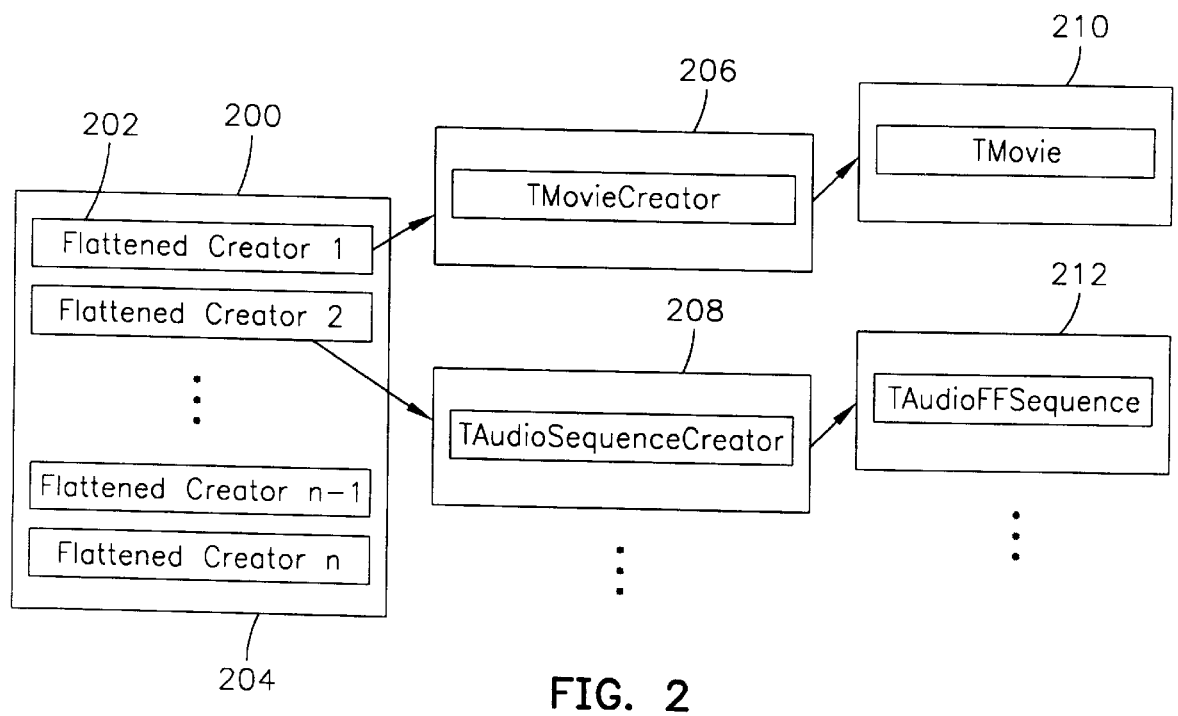
FIG. 2 is a block diagram of a registry store for an object-based global registry.

FIG. 2 details how only the creator classes 202, 204 are flattened into and resurrected from a file 200 (i.e., registry store). Several items are stored persistently on disk, including: the registry store 200, shared libraries 206, 208 which contain creator classes, and shared libraries 210, 212 which contain the classes to be created.

It should be noted that this object-based global registry mechanism is dependent on the streaming operations of each creator class, which may be written by different software developers. Any problems with flattening or resurrecting these creator classes 202, 204 could result in a corrupt registry store 200. The registry store 200 also needs to deal with versioning issues (i.e., backward and forward data compatibility has to be maintained). This object-based registry scheme may be less efficient, because meta information (i.e., attributes about the objects to be created) is contained in the creators and in order to query or display these attributes, the shared libraries 206, 208 containing the creator classes would first have to be loaded.

To dynamically add a new class into the CommonPoint frameworks (i.e., without recompiling and rebuilding), the following steps may be performed:

Instead of hard-coding the creation of the object, the framework uses the registry mechanism to look up the object.

The developer subclasses TObjectCreator (overriding CreateObject to call its own CreateXYZ method and providing methods for querying attributes of the object).

The developer writes the new class (usually a subclass of an existing class in the frameworks), and it provides an Initialize( ) method.

Returning to the time/media example, a framework does not hard-code the creation of a movie player (i.e., fplayer= new TMovie). Instead, it asks the media registry, which in turn gets a movie creator from the global registry, to return an appropriate player for the movie media type. In this case, to add a new preferred embodiment TWhizzyPlayer to the framework, the developer has to provide two new classes: TWhizzyPlayerCreator and TWhizzyPlayer. Finally, the developer needs to install the new creator object by flattening it out to the registry store.

This object-based global registry scheme has the advantage of being flexible (e.g., it can provide protocol to query attributes). However, the disadvantages are that a performance cost is incurred for loading shared libraries just for attribute lookup, it is vulnerable to streaming problems, and it requires developers to write more code.

Another way that the global class registry service can be implemented is an alternative preferred embodiment data-driven approach. The data-driven approach has many advantages over the object-based approach described above and this will become clear from the following description. Some of the advantages include: a more robust implementation (i.e., no streaming of objects), easier to use (e.g., a user only needs to edit a text file to change the installation), less software code needs to be written (e.g., no creator classes need to be written), and more efficient use of processing resources (e.g., do not need to load shared libraries just to query attributes). These advantages are gained at the expense of flexibility (e.g., a record format much be defined which each class attribute description follows). Even though this approach may not be as flexible, it may be extendible so that new features can be added (e.g., the record length may not be fixed, but the first few fields may be set in the registry store file).

In a typical data-driven approach, the global class registry 300 includes a set of data files 302, 304 that describe new extensions (i.e., classes) to be added dynamically during runtime to the CommonPoint environment. Conceptually, these entries form a logical table, where each row of the table represents an entry 302, 304 in the registry 300 as illustrated in FIG. 3. It should be noted that the size of each entry may vary according to the number of attributes for each new class.

Figure 4:
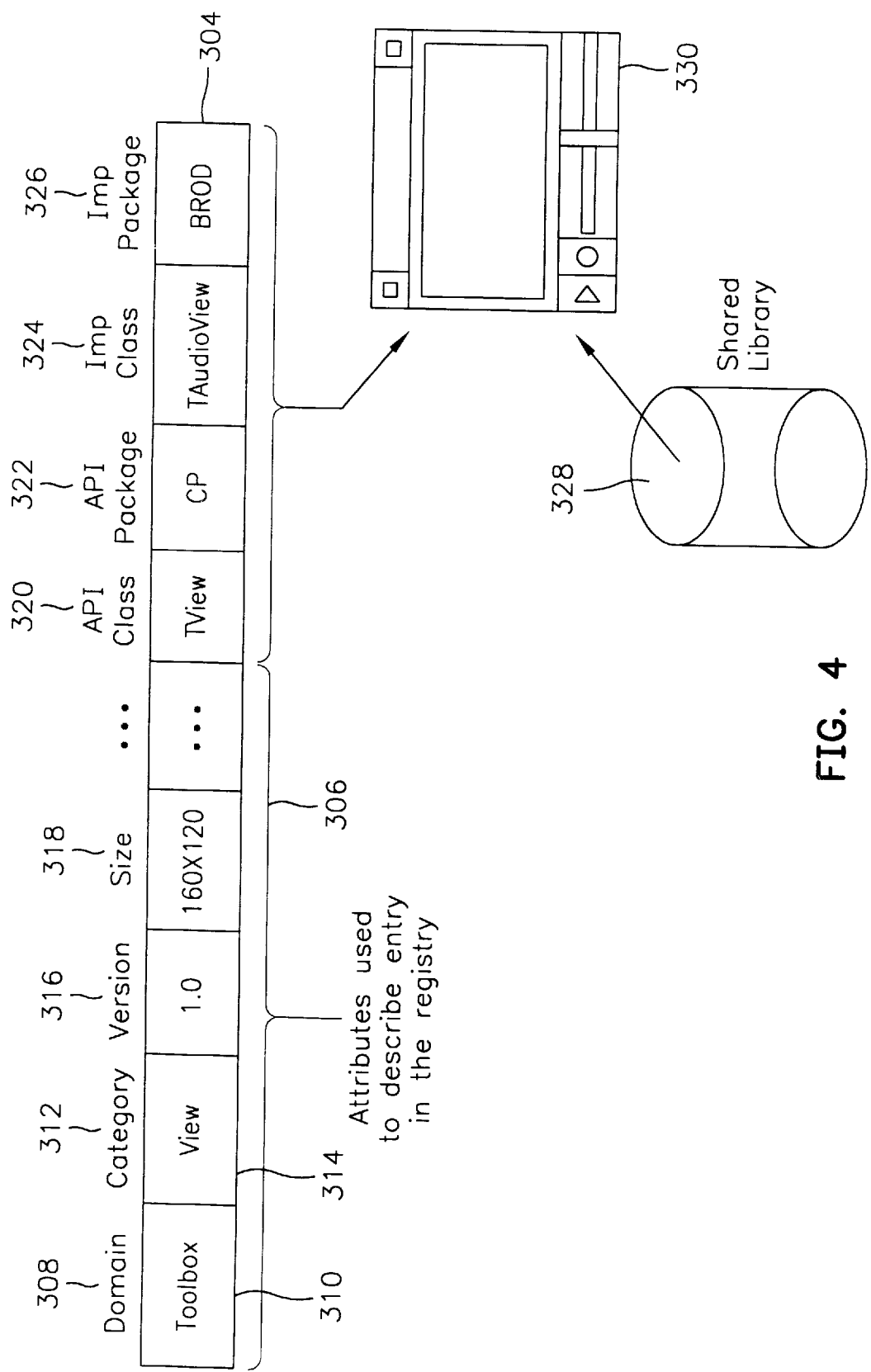
FIG. 4 is a block diagram of an example entry in the logical table for the data-driven global registry shown in FIG. 3.

A client application looks up an entry by specifying a set of attributes in a query. For example, the time/media framework can look up a view for an audio document from the global registry 300 by specifying attributes 306 like Domain=Toolbox, Category=View, Version=1.0, and Size= 160×120, etc. as shown in entry 304 of FIG. 4.

A data-driven mechanism for dynamically installing new classes into a framework may include two parts, including: the interface for writing (i.e., adding, removing, and editing entries) the global registry 300 and the interface for reading the registry 300. On the "writer" side, the one issue is to provide a portable solution for installing entries in the registry 300, which does not require the CommonPoint operating environment to be running during installation time. On the reader side, the global registry 300 will provide an Application Programming Interface (API) that allows client applications to retrieve entries from the registry 300.

An attribute 302 is simply a string describing an interesting characteristic of a new class. The value of an attribute 302 indicates what the attribute holds, and can be one of four possible types: string, integer, array (e.g., a Tanything object in the CommonPoint operating environment), or binary object (e.g., wrapped by a TAnyExtension object in the CommonPoint operating environment). The attribute name and value character strings can be encoded as ASCII or Unicode. The size limit for an attribute preferably is 1024 characters. ASCII preferably is used as the default with Unicode strings being used, if necessary, to input foreign language characters. For example, the "domain" 308 in which the class belongs is an attribute and "Toolbox" 310 is a possible value for that attribute. The version number 312 of the class is another example of an attribute and its value 314 can be something like "1.0".

There are four groups of attributes that a developer needs to provide for each new entry (i.e., subclass) to be added to the registry. They are the required attributes (defined by the global registry 300), optional attributes (domain owner), internal attributes (developer of the new class), and headers attributes (developer of the new class). The required and optional attributes describe some interesting characteristics of an entry (i.e., class) in the registry 300. They are both used in specifying a query for looking up the entry. If more than one entry satisfies the query, then all of the entries will be returned by the lookup. The required attributes preferably include Domain 308, Category 312, Version 316, while the optional attributes include ID (not shown), domain-specific attributes, and other attributes. The global registry 300 does not specify the policy for how the ID value should be generated. It is the responsibility of the domain owner to specify such a policy for that particular domain. Domain-specific attributes are specified by a particular domain owner, and these attributes may be required for that domain. A developer can add optional attributes to characterize the new class. For example, format and size 318 could be interesting attributes for a new time/media class component. The internal attributes are not used in the lookup process—instead, they are used only by the registry 300 for its internal operations. The internal attributes may include APIClass 320, APIPackage 322, ImpClass 324, and ImpPackage 326. These attributes must be provided by the developer. The headers attributes include all header files needed to compile the new classes (e.g., <Taligent/TimeMedia.h>).

The attributes for each entry 302, 304 in the registry 300 are stored persistently in a file in a storage device. The attributes preferably are written out in a generic file format such as the TAnything file format. The Tanything file format consists of slot-name-and-value pairs as shown below in Table 2.

TABLE 2

```
{
    /SlotName1 Value1
    . . .
    /SlotNameN ValueN
}
```

The file itself can be either ASCII or Unicode as noted above. The slot names (SlotName1 . . . SlotNameN) and values (Value1 . . . ValueN) can be either (1) ASCII characters with special %xxxx notation for Unicode characters, or (2) Unicode characters. Moreover, the value can be another TAnything (i.e., the structure can be recursive). The client application needs to create an attribute file in this format using whatever (ASCII or Unicode) text editor available on his or her platform.

As an example, for a time/media player, the attribute file may look as shown in Table 3.

TABLE 3

```
{
    /Domain        "TimeMedia"
    /Category      "Player"
    /Version       "1.0"
    /Optional      {
        /ID                    "83701349"
        /Format "AVI"
    }
    /Internal      {
        /APIClass              "TPlayer"
        /APIPackage    "CP"
        /ImpClass              "TAVIMovie"
        /ImpPackage    "OS/2"
    }
    /Headers       {
        /H0    "<Taligent/TimeMedia.h>"
        /H1    "<Taligent/AVIMovie.h>"
    }
}
```

A "domain" simply corresponds to a particular Common-Point subsystem. For example, time/media, a workspace, a file system, or translators are possible domains. As mentioned above, the domain name is a required attribute. Initially, the domain name space is not fully hierarchical; it has only one level of hierarchy. Within each domain, the structure is flat—there is no subdomain. By making this design decision current clients of the global registry 300 do not need hierarchical domain names. In addition, this flat structure simplifies the global registry 300 API. Since the API does not need to provide methods to traverse the domain hierarchy, it is easier to port to other platforms. On other platforms, such as the Microsoft Windows NT platform, a hierarchy an be built on top of this flat structure (e.g., the domain name attribute can contain a pathname value instead of a simple name) This flat structure can be easily extended to a hierarchical structure in the future when client applications have such a need.

The attribute file format supports internationalization by supporting Unicode. The attribute file (which preferably is in the TAnything format) can be either ASCII or Unicode. That is, the registry (more specifically, TAnything) supports both ASCII and Unicode encodings. Even in the ASCII case, TAnything supports Unicode by allowing both the slot name and its value to be Unicode characters using the special %xxxx notation, where x represents a one byte hex number. Also, it enables non-US developers to create these Unicode attribute files. Since TAnything supports Unicode, a Unicode text editor can be used to edit these Unicode characters. Further, it does not support any user-visible attributes (labels, images, icons, etc.), which should be stored in a higher-level user-data registry mechanism and localized using an archive mechanism.

To dynamically add a new class to the frameworks, the developer writes the new class and creates a shared library for it. The developer then follows the following process to register the new class into CommonPoint operating environment:

Generate the attribute file(s) for the new class(es). The developer needs to create an attribute file and enter the necessary attribute information in the above file format. This file preferably is portable across all platforms.

Perform any necessary platform-specific conversion for the attribute file(s). For a particular platform, certain platform-specific conversion needs to be performed on the attribute file, and the result is a non-portable "thing" that will be installed into the registry.

Installing the new class(es). To install the new class into the system, the developer needs to provide both the shared library 328 for the new class and the associated attribute file 304 as described in the above steps. The installation tools used in this step are platform specific. For example, for AIX, installation process is simply moving the shared library 328 into the library directory and the attribute file 304 into the configuration directory. For Microsoft Windows NT, installation involves running Setup.exe (which invokes an installer program that understands the format of the converted attribute file); it will register the new class into the Windows NT Registry.

In order for this registration mechanism (i.e., the ability to dynamically plug in a new class or component) to work, the relevant frameworks have to use the global class registry 300 to create an instance of the class or component instead of hard-coding the creation of that class or component.

The global registry 300 interface consists of three client-visible parts: global registry API, an attribute file, and shared library 328 containing the new class. The developer provides the shared library 328 and attribute file 304, while the global registry 300 provides a set of API classes. The interactions between the registry 300 and a calling client application can be summarized into the following steps:

The calling client application (i.e., caller) generates a query based on a set of attributes, and it calls the registry lookup method, which returns back an iterator for a list of object descriptors. The caller can access attributes about the objects without having to load the shared library 328 containing the new classes.

Given a set of preferences, the caller can further refine the selection by first examining the attributes of the objects (via the returned descriptors) before creating the objects (e.g., via the GlobalRegistryCreateObject global function).

The selected object 330 is then initialized with the appropriate parameters by the caller in the calling context.

The precise interface through which client applications can retrieve objects from the class registry is described in the following description. It contains detailed information about the API classes—their roles, their primary protocols, and some code samples. The preferred embodiment API consists of three major classes: TGlobalRegistryQuery, TGlobalRegistryIterator, and TGlobalRegistryObjectDescriptor. For the convenience of clients, the class TGlobalRegistryQuery provides a set of tokens for looking up the value of an attribute. It also captures the attributes describing the lookup query. The class TGlobalRegistryIterator provides a set of constructors for retrieving entries from the registry and to access the results of the query. Using the iterator, a client application can access the object descriptors one at a time, which are represented by the class TGlobalRegistryObjectDescriptor. The object descriptor contains information (such as the API class and package names, and other attributes) needed to create the objects.

In the following class declarations, only part of the methods are shown, and implementation details are not included. The TAnything class is a flexible associative (key-value pair) array that is efficient for storing primitive types and other types via the TAnyExtensionOf<AType>object wrapper.

Table 4 shows an example of the TGlobalRegistryQuery class.

TABLE 4

```
class TGlobalRegistryQuery {
public:
    static const TSimpleUnicodeArray& kDomain;
    static const TSimpleUnicodeArray& kCategory;
    static const TSimpleUnicodeArray& kVersion;
    static const TSimpleUnicodeArray& kOptional;
    static const TSimpleUnicodeArray& kID; // global ID
    static const TSimpleUnicodeArray& kInternal;
    static const TSimpleUnicodeArray& kAPIClass;
    static const TSimpleUnicodeArray& kAPIPackage;
    static const TSimpleUnicodeArray& kImpClass;
    static const TSimpleUnicodeArray& kImpPackage;
    static const TSimpleUnicodeArray& kHeaders;

TGlobalRegistryQuery(const TAnything& attributeValuePairs);
    TGlobalRegistryQuery();
    TGlobalRegistryQuery(const TGlobalRegistryQuery&);
    ~TGlobalRegistryQuery();
    // supports equality and streaming operations
    bool operator==(const TGlobalRegistryQuery&) const;
    TStream& operator>>=(Tstream&)const;
    TStream& operator<<=(TStream&);
```

TABLE 4-continued

```
    // called by TGlobalRegistryIterator
    bool Match(const TAnything& attributesValues) const;

const TAnything* GetAttributes() const;
    void SetAttributes(const TAnything& attributeValuePairs);
    void RemoveAttributes(const TAnything& attributeValuePairs);

private:
    // assignment operator is not supported.
    TGlobalRegistryQuery& operator=(const TGlobalRegistryQuery&);
};
```

In addition to providing a set of slot name tokens that can be used as keys to lookup their corresponding values in a TAnything data structure, the TGlobalRegistryQuery class provides a protocol for specifying (and modifying) a set of attributes; it has the Match( ) method that the TGlobalRegistryIterator class can use to evaluate whether a particular entry matches the specified attributes. If the match fails, the SetAttributes( ) method can be used to modify the query and re-submit the query again. For example, if the initial query contains attributes Domain=TimeMedia, Category=Player, Version=3.0, Format=MPEG, etc. If there was no MPEG player version 3.0, the client application can modify the one or more attributes via the SetAttributes( ) method. The TAnything argument attributeValuePairs would contain the new attribute-value pairs (e.g., Version=2.0, Format=QuickTime). The GetAttributes( ) and RemoveAttributes( ) methods allow the client to modify the attributes in the query.

Table 5 shows an example of the TGlobalRegistryIterator class.

TABLE 5

```
class TGlobalRegistryIterator : public
TIteratorOver<TGlobalRegistryObjectDescriptor> {
public:
    TGlobalRegistryIterator(const TGlobalRegistryQuery*
    queryToAdopt);
    TGlobalRegistryIterator(const TUnicodeArray& domain, const
    TUnicodeArray&
key);
    TGlobalRegistryIterator(const TUnicodeArray& domain);
    ~TGlobalRegistryIterator();
    // supports equality operation
    bool operator==(const TGlobalRegistryIterator&) const;

const TGlobalRegistryObjectDescriptor* First();
    const TGlobalRegistryObjectDescriptor* Next();

private;
    // default & copy constructors, assignment operator, streaming
    operators
    // are not supported.
    TGlobalRegistryIterator();
    TGlobalRegistryIterator(const TGlobalRegistryIterator&);
    TGlobalRegistryIterator& operator=(constTGlobalRegistryIterator&);
    TStream& operator>>=(TStream&) const;
    TStream& operator<<=(TStream&);
};
```

The TGlobalRegistryIterator class is the primary interface for the global registry 300; the constructors provide the protocol for retrieving "object descriptors" that are required for instantiating new classes. The first constructor takes a query as an argument. The resulting iterator can be used to iterate over a small list of object descriptors matching the attributes specified in the query. The second constructor is for client application's convenience, and takes the domain and key values as arguments. Because the key is a unique value within a particular domain, there is at most one descriptor that will be returned, and it can be accessed via the iterator's First( ) method. If there is no match, the method returns a NIL pointer. The last constructor is for client application's convenience. The iterator can be used to iterate over a list of object descriptors for a particular domain. If the search fails, the First( ) method returns a NIL pointer. The iterator manages the storage for the returned descriptors, so that the returned pointers are just aliases to descriptor objects owned by the iterator.

Table 6 shows an example of the TGlobalRegistryObjectDescriptor class.

TABLE 6

```
class TGlobalRegistryObjectDescriptor {
public:
    TaligentTypeExtensionDeclarationsMacro(TGlobalRegistryOb-
    jectDescriptor)

TGlobalRegistryObjectDescriptor(const TAnything& attributes);
    ~TGlobalRegistryObjectDescriptor();
    // supports hashing, equality, and streaming operations
    long Hash() const;
    bool operator==(const TGlobalRegistryObjectDescriptor&) const;
    TStream& operator>>=(TStream&) const;
    TStream& operator<<=(TStream&);

void GetAttributes(TAnything& attributeValues) const;

protected:
    TGlobalRegistryObjectDescriptor();

private:
    // copy constructor and assignment operator are not
    supported.
    TGlobalRegistryObjectDescriptor(const
    TGlobalRegistryObjectDescriptor&);
    TGlobalRegistryObjectDescriptor& operator=(const
TGlobalRegistryObjectDescriptor&);
};
```

The primary protocol provided by TGlobalRegistryObjectDescriptor is the GetAttributes( ) method for accessing the attributes of a new class. A client application should use the global function GlobalRegistryCreateObject (an example of which is shown in Table 7) to create an instance of the new class in a type-safe manner.

TABLE 7

```
template<class AType>
void GlobalRegistryCreateObject(AType*& theResultPtr,
                const TGlobalRegistryObjectDescriptor&
objectType,
                const TAllocationHeap& heap =
                TAllocation::kDefaultHeap);
```

The arguments needed by this global function are a base type pointer, an object descriptor, and a heap object.

Returning once again to the time/media registry example, the registry interacts with the global registry 300 to create an instance of a new class (e.g., TAVIMovie) in the following way. First, it provides a set of attributes and asks the global registry 300 to return a list of object descriptors that match these attributes. Some example ways to find this match are shown in Table 8, including: lookup by query, lookup by key, and iterate over domain. Second, the time/media registry will use a set of user defined preferences (set by its client application before the request to get a list of sequences) to select an appropriate sequence descriptor. It then creates an instance of the new player via the GlobalRegistryCreateObject global function using the returned object descriptor as an argument. At this point, the time/media registry will initialize the default-constructed player with the appropriate parameters, and then return it to its client application.

TABLE 8

```
1) Lookup by Query
TAnything attributes;
attributes[TGlobalRegistryQuery::kDomain] = "TimeMedia";
attributes[TGlobalRegistryQuery::kCategory] = "Player";
attributes[TGlobalRegistryQuery::kVersion] = "1.0";
attributes["Optional"]["Format"] = "QuickTime";
attributes["Optional"]["Size"] = "160x120";

TGlobalRegistryQuery query(attributes);
TGlobalRegistryIterator *iterator = new
TGlobalRegistryIterator(query); // create
on heap
if (iterator->First() == NIL) {
    // modify attributes and try again
    attributes["Optional"]["Format"] = "AVI"; // change
    "Format" to new value
    attributes["Optional"].Remove("Size"); // remove "Size" attribute
    query.SetAttributes(attributes);
    delete iterator;
    iterator = new TGlobalRegistryIterator(query);
}
TPlayer* player = NIL;
TAnything returnedAttributes;
bool found = false;
for (const TGlobalRegistryObjectDescriptor *desc = iterator->First();
        desc != NIL && found == false;
        desc = iterator->Next()) {
    desc->GetAttributes(returnedAttributes);
    if (returnedAttributes[TGlobalRegistry::kImpClass] ==
    "TAVIMovie") {
        found = true;
        ::GlobalRegistryCreateObject(player, *desc);
    }
}
delete iterator;
if (player != NIL) {
    // success!
    player->AdoptSequence(movieSequence);
    // Do whatever you want with this new movie player
    . . .
} // else we give up!

2) Lookup by Key
TSimpleUnicodeArray domain("Workspace");
TSimpleUnicodeArray key("84903936"); // this is a global ID
TGlobalRegistryIterator iterator(domain, key); // create local variable on
stack
TGlobalRegistryObjectDescriptor* desc = iterator.First();
if (desc != NIL) {
    TPrinter* printer;
    ::GlobalRegistryCreateObject(printer, *desc);
    // Do whatever you want with this new printer
} // else we exit here 3) Iterate over domain
TSimpleUnicodeArray domain("Translators");
TGlobalRegistryIterator iterator(domain); // create local variable on stack
if (iterator.First() != NIL) {
    TTranslator *translator;
    TAnything returnedAttributes;
    for (const TGlobalRegistryObjectDescriptor *desc = iterator.First();
            desc != NIL && found == false;
            desc = iterator.Next()) {
        desc->GetAttributes(returnedAttributes);
        // select one from the returned list
        . . .
        ::GlobalRegistryCreateObject(translator, *desc);
    // Do whatever you want with this new translator
} // else we exit here
```

One problem that may arise is when the returned list contains more than one entry from the global registry 300. Some possible ways to solve this problem are to use information from user preferences, if available, to pick the "best"

candidate. For example, the TGlobalRegistryObjectDescriptor provides a protocol for accessing attributes of a new class, so that a client application can select the most appropriate descriptor based on some user specified preferences before using the descriptor to create an instance of the new class.

Another solution is when there are multiple entries for different versions of the same type of object, then pick the one with the most recent version number.

Finally, a simple solution if all else fails, then the first one returned by the iterator is picked by default.

Now that the external design specification has been completed, some internal design specification will be discussed. The implementation of the registry 300 on AIX preferably uses a server because this approach is more efficient and makes the problem of updating the registry simpler (this is because the server is the only thing that knows about the data files in the configuration directory). The attributes of an entry 302, 304 preferably are be stored in a TAnything object. The registry's lookup table uses the following data structures: a dictionary of domain entries, where a domain is a dictionary of object entries. An object entry contains a TAnything, which encapsulates all the attributes associated with that object. The two level dictionary structure is needed to support the LookupByKey( ) method, while the domain dictionary structure supports the LookupByDomain( ) method. The domain dictionary data structure also efficiently supports the query mechanism where all the elements in a domain need to be compared sequentially against the specified attributes in the query.

Several implementation tradeoffs exist. For example, whether to have a class server or to locally access an object. The global registry can be implemented as a server. Alternatively, clients could create a "local access object" to the global registry. The access object would scan the configuration directory and build an in-memory image of the installed classes when the object is being constructed. The some tradeoffs between a server and an access object are as follows:

- A server offers global access and arbitrates multiple accesses.
- A server has smaller client application delays during creation, because an access object needs to build up an internal data structure for all the entries in the registry. This operation may involve scan all the file in a directory.
- An access object does not have all the server-related system overhead.
- An access object is more reliable.

Another implementation tradeoff is between using a query or a simple iterator. The tradeoff here is power and flexibility versus complexity. Having a query mechanism allows a client application to focus the lookup and get back a small list of candidates, while using an iterator approach leaves the task of selecting the returned values up to the client application. Of course, the iterator is a much simpler mechanism to implement because it simply gives access to all the objects in a particular domain to the client application. To satisfy the needs of different client applications, the global registry preferably provides support for both types of retrieval.

Another implementation tradeoff is between having a polymorphic or monomorphic TGlobalRegistryQuery class. The major benefit of making TGlobalRegistryQuery polymorphic is that common "queries" (e.g., lookup by key, iterator for a domain) can be organized into a hierarchy of query subclasses, while a monomorphic query class approach would express these common queries as explicit methods in another class (e.g., either as TGlobalRegistry Lookup( ) methods or TGlobalRegistryIterator constructors). Because the query object will be streamed across to an object or class server, TGlobalRegistryQuery class preferably is designed to be a monomorphic class for efficiency and reliability reasons.

The internal architecture preferably includes several internal support classes for the global registry 300 API. Examples of these classes are TDomainEntry, TObjectEntry, TGlobalRegistryCaller, and TGlobalRegistryDispatcher.

The TDomainEntry's constructor, shown below in Table 9, takes a character string, a Unicode array, or a standard text as an argument for a domain name, so that it could support the direct lookup of the domain. The Hash( ) and operator= =are needed to support the comparison operation being performed during a lookup in the "dictionary". For the time/media domain, TGlobalRegistryDispatcher can lookup the domain entry as follows: fDomainLookupTable [TDomainEntry("TimeMedia")]. The TDomainEntry, in turn, has a lookup table for all the objects in the domain. This lookup table is may be a "dictionary" data structure implemented using a TSetOf, because this is a more efficient approach. Also, because these are internal support classes used only by the TGlobalRegistryDispatcher in its implementation, the data structure is made public for efficient access (so there is no need to provide accessor methods for the data members).

TABLE 9

```
class TDomainEntry {
public:
    TDomainEntry(const char domainName[]);
    TDomainEntry(const TSimpleUnicodeArray&);
    TDomainEntry(const TStandardText&);
    ~TDomainEntry();
    long Hash() const;
    bool operator==(const TDomainEntry &) const;

TSetOf<TObjectEntry> fObjectLookupTable;
    TSimpleUnicodeArray fName;
};
```

Similarly, the TObjectEntry 's constructor, shown below in Table 10, takes a character string, a Unicode array, or a standard text as an argument for a global ID, so that it could support the direct lookup of an object entry. The Hash( ) and operator==are needed to support the comparison operation being performed during a lookup in the "dictionary". For the time/media domain, the TGlobalRegistryDispatcher can lookup the player object as follows: domainEntry.fObjectLookupTable[TObjectEntry("0003")]. The TObjectEntry constructor contains a TAnything, which consists of a list of attribute-value pairs.

TABLE 10

```
class TObjectEntry {
public:
    TObjectEntry(const char globalID[]);
    TObjectEntry(const TSimpleUnicodeArray&);
    TObjectEntry(const TStandardText&);
    ~TObjectEntry();
    long Hash() const;
    bool operator==(const TObjectEntry&) const;

TAnything fObjectAttributes;
    TSimpleUnicodeArray fID;
};
```

The TGlobalRegistryCaller class, shown in Table 11, is used by the TGlobalRegistryIterator to make an RPC to the dispatcher. The primary methods are LookupByQuery( ), LookupByKey( ), LookupByDomain( ). These methods invoke the corresponding dispatcher methods to perform the lookup and return the results. The ShutDown( ) method is used to send a request to the registry server to shut down itself.

TABLE 11

```
class TGlobalRegistryCaller : protected MRemoteCaller {
public:
    TGlobalRegistryCaller();
    ~TGlobalRegistryCaller();

TCollectionOf<TGlobalRegistryObjectDescriptor<*
        LookupByQuery(const TGlobalRegistryQuery& query);
    TGlobalRegistryObjectDescriptor*
        LookupByKey(const TUnicodeArray& domainName, const
        TUnicodeArray&
key);
    TCollectionOf<TGlobalRegistryObjectDescriptor>*
        LookupByDomain(const TUnicodeArray& domainName);
    void ShutDown();
};
```

Table 12 shows an example TGlobalRegistryDispatcher class.

TABLE 12

```
class TGlobalRegistryDispatcher : public MRemoteDispatcher {
public:
    static const THostSpecificPathName kConfigurationDirectory;

enum EGlobalRegistryRequest {
        kLookupByKey,
        kLookupByQuery,
        kLookupByDomain,
        kShutdown,
        kMaxRequest = kShutdown
    };

TGlobalRegistryDispatcher();
    ~TGlobalRegistryDispatcher();

TCollectionOf<TGlobalRegistryObjectDescriptor>*
        LookupByQuery(const TGlobalRegistryQuery& query);
    TGlobalRegistryObjectDescriptor*
        LookupByKey(const TUnicodeArray& domainName, const
        TUnicodeArray&
key);
    TCollectionOf<TGlobalRegistryObjectDescriptor>*
        LookupByDomain(const TUnicodeArray& domainName);

protected:
    void UpdateRegistry();
    void Initialize();
};
```

An UpdateRegistry( ) function preferably is used to scan the configuration directory and import all the attribute data into corresponding TAnything objects from the files in the directory; it also builds up the two-level dictionary data structure as described above. An Initialize( ) function finds the configuration directory and then calls an UpdateRegistry( ) function to set up the internal data structure. The LookupByKey, LookupByQuery, and LookupByDomain functions are used to implement the semantics of the corresponding TGlobalRegistryCaller class functions described above.

Figure 5:
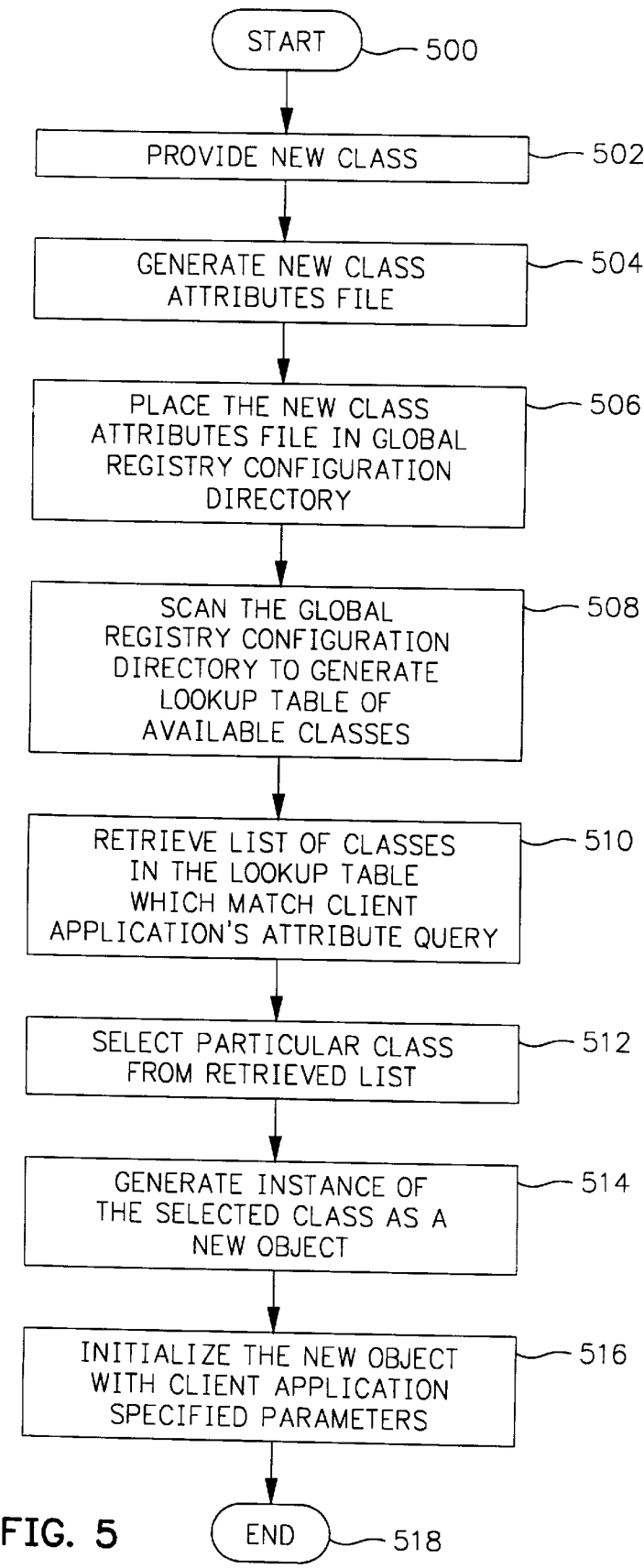
FIG. 5 is a flowchart of a preferred embodiment object oriented programming based data-driven global registry method for use to extend any object-oriented framework in the computer system shown in FIG. 1.

The present invention can be summarized in reference to FIG. 5 which is a flowchart of the preferred embodiment object oriented programming based data-driven global registry method for use by a client application and a server on a computer system. This method is performed by device-implemented steps in a series of distinct processing steps 500–518 that can be implemented in one or more processors.

A new class defined in a shared class library on the server is provided 502 which has data members and member functions related to a particular task. A new class attributes file is generated 504 which specifies attributes associated with the new class. The new class attributes file is placed 506 in a global registry configuration directory on the server such that a plurality of client applications can access the global registry configuration directory to determine if the new class has been installed in the class library.

Subsequently, the global registry configuration directory is scanned 508 for class attribute files to generate a lookup table containing an entry for each class and the associated attributes in the class attribute files. A list of classes is retrieved 510 which match a client applications attribute query based on contents of a plurality class attributes files in the global registry configuration directory. This set of information may be collected in the lookup table to facilitate searching for classes matching the query. A particular class is selected 512 from the retrieved list of classes based on a predetermined preference set. An instance of the selected class is generated 514 as a new object and the new object is initialized 516 with client application specified parameters. The new object may be initialized with default client application specified parameters unless particular client application specified parameters are obtained from the client application.

Figure 6:
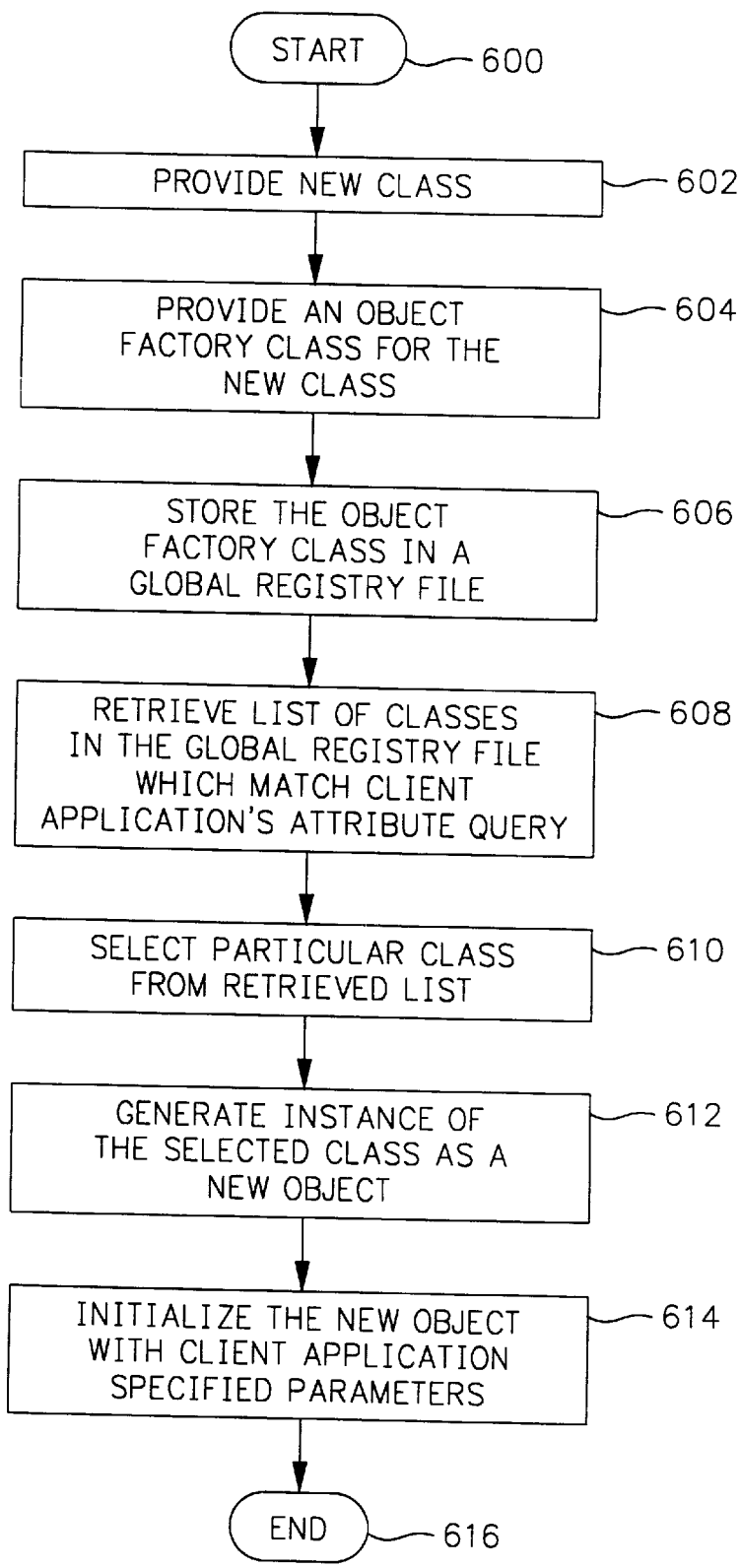
FIG. 6 is a flowchart of an alternative preferred embodiment object-based global registry method for use to extend any object oriented framework in the computer system shown in FIG. 1.

In addition, the present invention can be summarized in reference to FIG. 6 which is a flowchart of another preferred embodiment object oriented programming based global registry method for use by a client application and a server on a computer system which is object-based. This method is performed by device-implemented steps in a series of distinct processing steps 600–616 that can be implemented in one or more processors.

A new class defined in a shared class library on the server is provided 602 which has data members and member functions related to a particular task. In addition, an object factory class for the new class, defined in the shared class library, is provided 604 which has data members and member functions related to creating instances of the new class and related to attributes associated with the new class such that a plurality of client applications can access the class library to determine if the new class has been installed in the class library by accessing the provided object factory class. The object factory class for the new class preferably is stored 606 along with a plurality of other object factory classes in a global registry file.

Subsequently, a list of object factory classes which match a client application attribute query is retrieved 608 based on contents of a plurality object factory classes in the class library. Only those object factory classes which match a client applications attribute query need to be resurrected from the global registry file to form the list of object factory classes. However, other classes may be resurrected without modifying the schema of this global registry process. A particular object factory class is selected 610 from the retrieved list of object factory classes based on a predetermined preference set. An instance of the selected class is generated 612 as a new object with the selected object factory class and the new object is initialized 614 with client application specified parameters. The new object may be initialized with default client application specified parameters unless particular client application specified parameters are obtained from the client application.

Either global registry process may be implemented in a computer system by storing the classes and files in a storage device 120 and using a processor 110 in conjunction with RAM 114 and/or ROM to generate objects from the stored classes. A communications adapter 134 may communicate with a server, operatively coupled to the computer system by a communication network, to obtain information from a global registry file or directory the computer system and other computer systems.

In addition, a program storage device may be created which is readable by a computer system tangibly embodying a program of instructions executable by the computer system. This program of instructions would perform one or more parts of either of the object oriented programming based global registry methods described above.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the actual names or division or functions may be changed between the OOP classes and objects, detailed above, while maintaining substantially the same functionality without departing from the scope and spirit of the present invention.

What is claimed is:

1. A data-driven global registry method to extend any framework in an object oriented programming (OOP) based computer system, the method comprising the steps of:
   (a) providing a new class defined in a shared class library on the server which has data members and member functions related to a particular task;
   (b) generating a new class attributes file which specifies attributes associated with the new class; and
   (c) placing the new class attributes file in a global registry configuration directory such that a plurality of clients can access the global registry configuration directory to determine if the new class has been installed in the class library.

2. The data-driven global registry method of claim 1 further comprising the steps of:
   (d) retrieving a list of classes which match a client's attribute query based on contents of a plurality of class attributes files in the global registry configuration directory;
   (e) selecting a particular class from the retrieved list of classes based on a predetermined preference set;
   (f) generating an instance of the selected class as a new object; and
   (g) initializing the new object with client specified parameters.

3. The data-driven global registry method of claim 2 wherein the initializing step comprises initializing the new object with default client specified parameters unless particular client specified parameters are obtained from the client.

4. The data-driven global registry method of claim 2 further comprising the step of scanning the global registry configuration directory for class attributes files to generate a lookup table containing an entry for each class and the associated attributes in the class attributes files and wherein the retrieving step comprises generating the list of classes by searching the lookup table for entries which match the client's attribute query.

5. A program storage device readable by a computer system tangibly embodying a program of instructions executable by the computer system to perform an object oriented programming (OOP) based data-driven global registry method for use by a client, the method emodied on the storage device comprising the steps of:
   (a) providing a new class defined in a shared class library which has data members and member functions related to a particular task;
   (b) generating a new class attributes file which specifies attributes associated with the new class; and
   (c) placing the new class attributes file in a global registry configuration directory such that a plurality of client's can access the global registry configuration directory to determine if the new class has been installed in the class library.

6. The program storage device of claim 5 wherein the method further comprises the steps of:
   (d) retrieving a list of classes which match a client's attribute query based on contents of a plurality of class attributes files in the global registry configuration directory;
   (e) selecting a particular class from the retrieved list of classes based on a predetermined preference set;
   (f) generating an instance of the selected class as a new object; and
   (g) initializing the new object with client specified parameters.

7. The program storage device of claim 6 wherein the initializing step of the method comprises initializing the new object with default client specified parameters unless particular client specified parameters are obtained from the client.

8. The program storage device of claim 6 wherein the method further comprises the step of scanning the global registry configuration directory for class attributes files to generate a lookup table containing an entry for each class and the associated attributes in the class attributes files and wherein the retrieving step comprises generating the list of classes by searching the lookup table for entries which match the client's attribute query.

9. A data-driven global registry for use to extend a framework in an object oriented programming (OOP) based computer system, comprising:
   (a) storage means, on a server in the OOP based computer system, for storing OOP-based classes, the classes including a new class defined in a shared class library, which has data members and member functions related to a particular task; and
   (b) a processor, operatively coupled to the storage means, which generates a new class attributes file that specifies attributes associated with the new class and places the new class attributes file in a global registry configuration directory on the storage means such that a plurality of clients can access the global registry configuration directory to determine if the new class has been installed in the class library.

10. The data-driven global registry of claim 9 further comprising an object instantiation means, operatively coupled to the storage means, for retrieving a list of classes which match a client's attribute query based on contents of a plurality of class attributes files in the global registry configuration directory, selecting a particular class from the retrieved list of classes based on a predetermined preference set, generating an instance of the selected class as a new object, and initializing the new object with client specified parameters.

11. The data-driven global registry of claim 10 wherein the object builder means comprises means for initializing the new object with default client specified parameters unless particular client specified parameters are obtained from the client.

12. The data-driven global registry of claim 10 wherein the object builder means comprises:

(a) means for scanning the global registry configuration directory for class attributes files to generate a lookup table containing an entry for each class and the associated attributes in the class attributes files; and (b) means for generating the list of classes by searching the lookup table for entries which match the client's attribute query.

13. An object-based global registry method for use to extend a framework in an object oriented programming (OOP) based computer system, comprising the steps of:

(a) providing a new class defined in a shared class library on the server which has data members and member functions related to a particular task; and (b) providing an object factory class for the new class, defined in the shared class library, which has data members and member functions related to creating instances of the new class and related to attributes associated with the new class such that a plurality of client can access the class library to determine if the new class has been installed in the class library by accessing the provided object factory class.

14. The object-based global registry method of claim 13 further comprising the steps of:

(c) retrieving a list of object factory classes which match a client's attribute query based on contents of a plurality of object factory classes in the class library;

(d) selecting an object factory class from the retrieved list of object factory classes based on a predetermined preference set;

(e) generating an instance of a new class as a new object with the selected object factory class; and (f) initializing the new object with client application specified parameters.

15. The object-based global registry method of claim 14 wherein the initializing step comprises initializing the new object with default client specified parameters unless particular client specified parameters are obtained from the client.

16. The object-based global registry method of claim 13 further comprising the step of storing the object factory class for the new class along with a plurality of other object factory classes in a single global registry file.

17. The object-based global registry method of claim 14 further comprising the step of storing the object factory class for the new class along with a plurality of other object factory classes in a global registry file and wherein the retrieving step comprises resurrecting only those object factory classes from the global registry file which match a client's attribute query to form the list of object factory classes.

18. A program storage device readable by a computer system tangibly embodying a program of instructions executable by the computer system to perform an object oriented programming (OOP) based global registry method for use to extend a framework, the method embodied on the storage device comprising the steps of:

(a) providing a new class defined in a shared class library on the server which has data members and member functions related to a particular task; and (b) providing an object factory class for the new class, defined in the shared class library, which has data members and member functions related to creating instances of the new class and related to attributes associated with the new class such that a plurality of clients can access the class library to determine if the new class has been installed in the class library by accessing the provided object factory class.

19. The program storage device of claim 18 wherein the method further comprises the steps of:

(c) retrieving a list of object factory classes which match a client's attribute query based on contents of a plurality of object factory classes in the class library;

(d) selecting an object factory class from the retrieved list of object factory classes based on a predetermined preference set;

(e) generating an instance of a new class as a new object with the selected object factory class; and (f) initializing the new object with client specified parameters.

20. The program storage device of claim 19 wherein the initializing step comprises initializing the new object with default client specified parameters unless particular client specified parameters are obtained from the client.

21. The program storage device of claim 18 wherein the method further comprises the step of storing the object factory class for the new class along with a plurality of other object factory classes in a single global registry file.

22. The program storage device of claim 19 wherein the method further comprises the step of storing the object factory class for the new class along with a plurality of other object factory classes in a global registry file and wherein the retrieving step comprises resurrecting only those object factory classes from the global registry file which match a client's attribute query to form the list of object factory classes.

23. A global registry for use to extend a framework in an object oriented programming (OOP) based computer system, comprising:

(a) storage means, on a server in the computer system, for storing OOP-based classes, the classes, including:

(i) a new class defined in a shared class library on the server which has data members and member functions related to a particular task; and (ii) an object factory class for the new class, defined in the shared class library, which has data members and member functions related to creating instances of the new class and related to attributes associated with the new class such that a plurality of clients can access the class library to determine if the new class has been installed in the class library by accessing the object factory class; and (b) a processor, operatively coupled to the storage means, which generates a new class object as an instance of the new class stored in the storage means upon request by a client.

24. The global registry of claim 23 further comprising an object instantiation means, operatively coupled to the storage means, for retrieving a list of object factory classes which match a client's attribute query based on contents of a plurality of object factory classes in the class library, selecting an object factory class from the retrieved list of object factory classes based on a predetermined preference set, generating an instance of a new class as a new object with the selected object factory class, and initializing the new object with client specified parameters.

25. The global registry of claim 24 wherein the object builder means comprises means for initializing the new object with default client specified parameters unless particular client specified parameters are obtained from the client.

26. The global registry of claim 23 further comprising means for storing the object factory class for the new class along with a plurality of other object factory classes in a single global registry file.

27. The global registry of claim 24 further comprising means for storing the object factory class for the new class along with a plurality of other object factory classes in a global registry file and wherein the object builder means comprises means for resurrecting only those object factory classes from the global registry file which match a client's attribute query to form the list of object factory classes.

* * * * *